(12) United States Patent
Sokn et al.

(10) Patent No.: US 11,614,262 B2
(45) Date of Patent: Mar. 28, 2023

(54) SYSTEM AND METHOD FOR CURRENT LIMITING AND DEFROST ENHANCEMENT

(71) Applicant: RESEARCH PRODUCTS CORPORATION, Madison, WI (US)

(72) Inventors: Erick L. Sokn, Madison, WI (US);
Stephen Moon, Madison, WI (US);
Aditya Rane, Madison, WI (US);
Sergey Baranov, Madison, WI (US);
Charles Baker, Madison, WI (US)

(73) Assignee: Research Products Corporation, Madison, WI (US)

( * ) Notice: Subject to any disclaimer, the term of this patent is extended or adjusted under 35 U.S.C. 154(b) by 214 days.

(21) Appl. No.: 16/884,608

(22) Filed: May 27, 2020

(65) Prior Publication Data
US 2021/0372677 A1    Dec. 2, 2021

(51) Int. Cl.
F25B 47/02    (2006.01)

(52) U.S. Cl.
CPC .................. F25B 47/02 (2013.01)

(58) Field of Classification Search
CPC  F25B 47/02; F25B 47/006; F25B 2321/0212; F25B 2600/024; F25B 2700/15
See application file for complete search history.

(56) References Cited

U.S. PATENT DOCUMENTS

| | | | |
|---|---|---|---|
| 7,481,069 B2 | 1/2009 | Lifson et al. | |
| 7,845,183 B2 | 12/2010 | Singh et al. | |
| 7,975,495 B2 | 7/2011 | Voorhis et al. | |
| 8,051,668 B2 | 11/2011 | Singh et al. | |
| 8,413,454 B2 | 4/2013 | Butler et al. | |
| 8,459,053 B2 | 6/2013 | Pham et al. | |
| 8,813,511 B2 | 8/2014 | Kopko et al. | |
| 9,476,625 B2 | 10/2016 | McSweeney | |
| 9,494,158 B2 | 11/2016 | Pham et al. | |

(Continued)

FOREIGN PATENT DOCUMENTS

| | | |
|---|---|---|
| JP | 2007-183059 | 7/2007 |
| KR | 1020080077454 | 8/2008 |

(Continued)

OTHER PUBLICATIONS

Hwang, Air conditioner and a method for controlling the same, 2019, Full Document (Year: 2019).*

(Continued)

Primary Examiner — Nael N Babaa
(74) Attorney, Agent, or Firm — Foley & Lardner LLP

(57) ABSTRACT

A dehumidifying system and method for reducing humidity in ambient air is disclosed. The system includes a circulation unit, a refrigeration unit, a condensate receptacle for receiving condensate generated by the refrigeration unit, a controller to control both the circulation and refrigeration units, and wherein the controller receives input from one or more ambient sensors configured to sense ambient conditions, and a user interface configured to receive input from a user. The system implements variable speed control within the circulation and/or refrigeration unit to maximize efficiency or capacity under a current threshold, and enables the system to delay the need for defrost cycling during low temperature operation.

20 Claims, 9 Drawing Sheets

(56) References Cited

U.S. PATENT DOCUMENTS

| | | | |
|---|---|---|---|
| 9,709,311 | B2 | 7/2017 | Popli et al. |
| 9,810,469 | B2 | 11/2017 | Boehde |
| 10,072,862 | B2 | 9/2018 | Goel |
| 10,077,912 | B2 | 9/2018 | Hong et al. |
| 10,132,543 | B2 | 11/2018 | Popli et al. |
| 10,161,662 | B2 | 12/2018 | Goel et al. |
| 10,197,319 | B2 | 2/2019 | Popli et al. |
| 10,228,152 | B2 | 3/2019 | Goel |
| 10,436,491 | B2 | 10/2019 | Popli et al. |
| 10,465,677 | B2 | 11/2019 | Saukko et al. |
| 10,488,092 | B2 | 11/2019 | Trudeau et al. |
| 2011/0120165 | A1* | 5/2011 | Byun ............... F04C 28/06 62/230 |

FOREIGN PATENT DOCUMENTS

| | | | |
|---|---|---|---|
| KR | 1020130032780 | | 4/2013 |
| KR | 20190088827 A1 * | 1/2019 | ............ F24F 11/52 |
| KR | 1020190088827 | | 7/2019 |

OTHER PUBLICATIONS

International Search Report and Written Opinion on PCT PCT/US2021/034336 dated Sep. 17, 2021 (12 pages).

\* cited by examiner

SYSTEM AND METHOD FOR CURRENT LIMITING AND DEFROST ENHANCEMENT

BACKGROUND

The present disclosure relates generally to dehumidifying systems for reducing humidity of ambient air. More specifically, the present disclosure relates to controllably varying operating speeds of a compressor and/or fan contained within a refrigerant-based dehumidifying system to optimize system performance and/or system capacity.

Dehumidifying systems are often designed to run at predetermined or fixed settings, wherein compressor and/or fan speeds are set based on an efficiency or capacity requirement. Such static operation of dehumidifying systems reduces the ability of the system to perform at capacity while maintaining efficient operation or vice versa. Furthermore, with fixed operation, dehumidifying systems may risk exceeding circuit current requirements. This may be exhibited under low temperature conditions, as many refrigerant-type dehumidifying systems may exhibit a decrease in efficiency during dehumidifying operations. This decrease in efficiency can frequently be attributed to ice buildup on internal evaporator coils (thus reducing useable coil surface area) and a need to defrost coils before resuming dehumidification. While use of a desiccant or implementation of a desiccant-based dehumidification system may expand operable temperature ranges, such systems also require significantly more energy to operate compared to a refrigerant type system. Furthermore, delaying the need for defrost cycling by varying compressor and/or fan speeds increases the dehumidification capacity of the dehumidifying system compared to capacity with fixed speed operation.

It would be advantageous to provide a versatile dehumidifying system that variably operates a contained fan and/or compressor based on environmental conditions in order to fully optimize performance of the unit for capacity or efficiency.

SUMMARY

According to an exemplary embodiment of the present disclosure, a dehumidifying system includes a circulation unit comprising a fan motor, a refrigeration unit comprising a compressor, and a controller operatively coupled to the circulation unit and the refrigeration unit. The controller is configured to determine a current draw associated with at least one of the motor and the compressor, compare the current draw to a current threshold, and adjust the speed of operation of at least one of the motor and the compressor in response to the current draw satisfying the current threshold.

According to an exemplary embodiment of the system, determining a current draw is performed iteratively according to a predetermined time interval.

According to another embodiment, the system further includes one or more ambient sensors in communication with the controller, wherein the controller is further configured to receive sensed information from the one or more ambient sensors.

According to another embodiment of the system, adjusting the speed of operation of at least one of the motor and compressor is based on the sensed information.

According to another embodiment of the system, the current threshold is based on the sensed information.

According to another embodiment, the system further includes a user interface in communication with the controller, wherein the controller is further configured to receive one or more inputs via the user interface.

According to another embodiment of the system, adjusting the speed of operation of at least one of the motor and the compressor is based on the received one or more inputs.

According to another embodiment of the system, the current threshold is based on the received one or more inputs.

According to another embodiment of the system, the controller is further configured to determine a temperature measurement associated with at least one of the circulation unit and the refrigeration unit and, responsive to determining the temperature measurement, compare the temperature measurement to a temperature threshold.

According to another embodiment of the system, adjusting the speed of operation of at least one of the motor and the compressor is performed in response to the temperature measurement satisfying the temperature threshold.

According to an exemplary embodiment of the present disclosure, a dehumidification method includes: determining, by a controller, a current draw associated with at least one of a motor and a compressor within a dehumidifying system; comparing, by the controller, the current draw to a current threshold; and adjusting a speed of operation of at least one of the motor and the compressor in response to the current draw satisfying the current threshold.

According to an embodiment, the method further includes receiving, by the controller, an input from at least one of a current sensor, an ambient sensor, and a user interface.

According to an implementation of the method, the current threshold is based on the received input.

According to an implementation of the method, adjusting the speed of operation of at least one of the motor and the compressor is based on the received input.

According to an exemplary embodiment of the present disclosure, a dehumidification method includes: determining, by the controller, a temperature associated with at least one of a compressor and an ambient temperature; comparing, by the controller, the temperature to a temperature threshold; and adjusting a speed of operation of at least one of the motor and the compressor in response to the current draw satisfying the temperature threshold.

According to an implementation of the method, the determined temperature associated with the compressor is based on a temperature within a suction line.

According to an embodiment, the method further includes determining, by the controller, a current draw associated with at least one of the compressor and a fan motor.

According to an implementation of the method, adjusting the speed of at least one of the motor and the compressor is based on the current draw.

According to an embodiment, the method further includes receiving, by the controller, an input from at least one of an ambient sensor and user interface.

According to an implementation of the method, the temperature threshold is based on the received input.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE FIGURES

A clear conception of the advantages and features constituting the present disclosure, and of the construction and operation of typical mechanisms provided with the present disclosure, will become more readily apparent by referring to the exemplary, and therefore non-limiting, embodiments illustrated in the drawings accompanying and forming a part of this specification, wherein like reference numerals designate the same elements in the several views, and in which.

Figure 1:
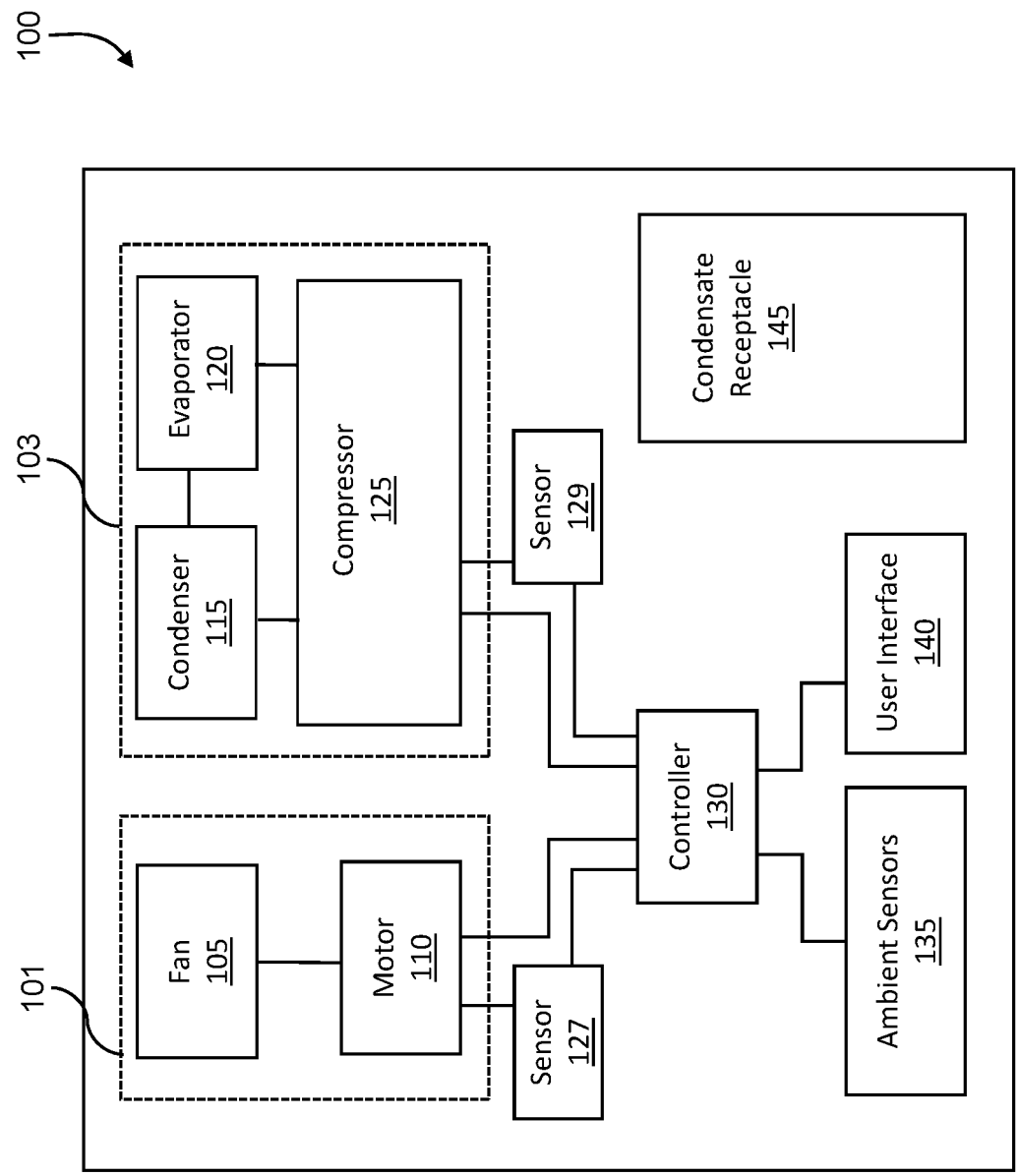
FIG. 1 is a block diagram illustrating a dehumidifying system according to an exemplary embodiment.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Referring generally to the figures, a dehumidifying system for reducing and removing moisture from ambient air may include an air circulation unit, a refrigeration unit, and a controller operably coupled to both the air circulation unit and refrigeration unit. In various embodiments, the air circulation unit may include a blower or fan operably coupled to a motor, which is configured to actuate the fan or blower. The refrigeration unit may include a refrigerant circulated by a compressor, which is fluidly coupled to an evaporator and a condenser. The dehumidifying system may also include one or more ambient sensors configured to detect one or more ambient conditions. In various embodiments, the controller may receive one or more inputs from the one or more ambient sensors, and the controller may in turn control the air circulation unit and/or refrigeration unit responsive to the received inputs. In various embodiments, the dehumidifying system may include a user interface operably coupled to the controller and configured to facilitate control of the air circulation unit and/or refrigeration unit. The dehumidifying system may also include a condensate receptacle to receive condensate generated by the condenser and/or evaporator.

In various embodiments, the dehumidifying system may be configured to operate based on ambient conditions sensed by the one or more ambient sensors. In various embodiments, ambient condition thresholds may be predetermined such that the dehumidifying system may tailor operation when the one or more ambient sensors detects an ambient condition above or below a predetermined threshold.

In various embodiments, the dehumidifying system may operate based on one or more preset modes. In various implementations the controller may be configured to control at least one of the circulation unit and the refrigeration unit based on the one or more preset modes. In various embodiments, the one or more preset modes may be predetermined by a manufacturer of the dehumidifying system, by a user of the dehumidifying system, or a combination thereof. In various embodiments, the one or more preset modes may include modes to maximize efficiency, maximize capacity, maintain a current draw, maintain a temperature within the dehumidifying system (e.g., within a suction line), maintain a temperature and/or humidity level outside the dehumidifying system, etc. In various implementations, performance parameters, such as capacity and/or efficiency may be determined (e.g., via the controller) based on an optimization matrix. In various embodiments, an optimization matrix can be generated for one or more operating conditions of the dehumidifying system. In various embodiments, the one or more operating conditions of the dehumidifying system may be determined based on an input received by a user, one or more preset modes, and/or input(s) received by one or more sensors within dehumidifying system (e.g., ambient sensors, current sensors, pressure sensors, etc.). An optimization matrix for any particular operating condition may include an algorithm for determining a capacity and corresponding efficiency for dehumidifying system at various operational settings. In various implementations, operational settings may include operational speeds of one or more components within dehumidifying system (e.g., compressor speed, fan speed, etc.). Consequently, for each operational condition, a matrix can be generated to outline capacity and efficiency of the dehumidifying system at various operational settings. Within each optimization matrix, a maximal capacity and/or maximal efficiency can be determined for each operational condition. In various implementations, maximal capacity is defined in pints per day of water removal by dehumidifying system 100. In various implementations, maximal efficiency is defined in liters of water removed per kilowatt hour by dehumidifying system 100. In various implementations, at least one of the maximal capacity and maximal efficiency preset modes may be based on a capacity and/or efficiency rating associated with one or more components within dehumidifying system 100. In various implementations, capacity and/or efficiency determined via one or more optimization matrices may be used to determine one or more current, temperature, pressure, airflow, and/or runtime thresholds within dehumidifying system 100.

In various embodiments, the dehumidifying system may operate based on a predetermined current limit. In various implementations, the controller may be configured to monitor a total current draw of the dehumidifying system and/or a current draw corresponding to at least one of the circulation unit and the refrigeration unit. In various implementations, the controller may be configured to adjust operation of the circulation unit and/or refrigeration unit based on the predetermined current limit. In various implementations, the controller may increase or decrease a speed of a motor within the circulation unit, increase or decrease a speed of a compressor within the refrigeration unit, or a combination based on the comparison of a current draw to a current threshold. For example, the controller may decrease the speed of the motor until the dehumidifying system current draw meets a current threshold and/or is below the predetermined current limit. In various implementations, the controller may increase or decrease speeds of one or more components to a preset level, adjust one or more speeds iteratively in a stepwise fashion, or a combination thereof to satisfy a set threshold.

In various embodiments, the controller may be configured to monitor a temperature within or exterior to the dehumidifying system. In various implementations, the temperature may be associated with a suction line, an evaporator coil, etc. In various implementations, the controller may be configured to adjust operation of the circulation unit and/or refrigeration unit based on the monitored temperature. In various implementations the controller may increase or decrease a speed of a motor within the circulation unit, increase or decrease a speed of a compressor within the refrigeration unit, or a combination thereof until a threshold associated with the monitored temperature are reached. In various implementations, the controller may increase or decrease speeds of one or more components to a preset level, adjust one or more speeds iteratively in a stepwise fashion, or a combination thereof. In various embodiments, the controller may be configured to operate the dehumidifying system within a defrost cycle. In various implementations, the defrost cycle may be based on a threshold temperature, a speed of a compressor and/or motor, or a combination thereof.

In a preferred embodiment, a dehumidifying system includes a refrigeration unit containing a compressor, a circulation unit containing a motor, a controller configured to control the refrigeration unit and the circulation unit, and one or more sensors. The dehumidifying system may dehumidify an area based on conditions detected by the one or more sensors and/or one or more preset modes of operation by the controller. The one or more sensors may be configured to sense at least one of a temperature, a humidity, and a current draw. The controller may determine a current draw associated with the refrigeration unit, the circulation unit, and/or the system as a whole. The controller subsequently compares the detected current draw to a current threshold. If the detected current meets the current threshold, the controller will adjust a speed of the compressor and/or motor (e.g., decrease speed). After adjusting the compressor and/or motor speed, the controller will again determine a current draw and compare the current draw to the current threshold. The system may continuously iterate through operations including determining the current draw, comparing the current draw to the current threshold, and adjusting the compressor and/or fan speed. Determining the current draw to the current threshold may prevent the system from drawing excess current and potentially causing damage to the system and/or a circuit on which the system operates. Furthermore, a current-limited operation facilitates the system to operate to maximum capacity. For example, if the controller determines that the system current draw does not meet the current threshold, the controller may increase the compressor and/or motor speed to increase system capacity.

In another preferred embodiment, a dehumidifying system includes a refrigeration unit containing a compressor, a circulation unit containing a motor, a controller configured to control the refrigeration unit and the circulation unit, and one or more sensors. The dehumidifying system may dehumidify an area based on conditions detected by the one or more sensors and/or one or more preset modes of operation by the controller. The one or more sensors may be configured to detect at least one of a temperature, a humidity, and a current draw. The controller may determine a temperature measurement associated with a system component, an interior region within the system, and/or an exterior region outside the system. The controller subsequently compares the temperature measurement to a temperature threshold. If the temperature measurement does not meet the temperature threshold, the controller may maintain or adjust a speed of the compressor and/or motor. If the temperature measurement meets the temperature threshold, the controller may cause the system to begin defrost cycling wherein the system increases a temperature within the refrigeration unit. The system may iterate through determining the temperature, comparing the current draw to the current threshold, and adjusting the compressor and/or fan speed. Variably adjusting the speed of the compressor and/or motor based on a determined temperature measurement may enable the controller to delay the onset of defrost cycling (to defrost components within the refrigeration unit). Delaying onset of defrost cycling increases dehumidification capacity of the dehumidifying system at lower ambient temperatures.

Referring specifically to FIG. 1, a block diagram of a dehumidifying system 100 is shown according to an exemplary embodiment. As shown, dehumidifying system 100 includes a circulation unit 101, a refrigeration unit 103, a controller 130, ambient sensors 135, and user interface 140. Circulation unit 101 includes a fan 105 for circulating ambient air through dehumidifying system 100. Fan 105 is operatively coupled to and actuated by a motor 110. In various embodiments, fan 105 may be a blower, impeller, or any other mechanism known in the art for facilitating airflow. In various embodiments, circulation unit 101 may include any number of motors or actuating mechanisms for operating a fan or blower. In various embodiments, fan 105 may be a plurality of fans or other air circulators.

Refrigeration unit 103 includes a gas or fluid refrigerant that circulates through an evaporator 120 for cooling ambient air (via refrigerant circulating therein) to condense and remove moisture therefrom and a condenser 115 for reheating ambient air (and condensing the circulating refrigerant), both of which are fluidly coupled to a compressor 125. Each of evaporator 120 and condenser 115 may include a plurality of coils to facilitate heat transfer. The refrigerant circulated within refrigeration unit 103 may be a working fluid, gas, or coolant comprising one or more hydrocarbons or any other substance for facilitating heat transfer known in the art. Refrigerant flow through refrigeration unit 103 is moderated by compressor 125. In various embodiments, refrigeration unit 101 may include one or more metering devices coupled between the condenser 115 and the evaporator 120. The one or more metering devices may include, but are not limited to, one or more thermal expansion valves and/or cap tubes. The one or more metering devices may control circulation of refrigerant between the condenser 115 and the evaporator 120, wherein the one or more metering devices may cause a pressure drop between the condenser 115 and the evaporator 120 such that the circulating refrigerant can be boiled off, thereby cooling the evaporator 120 and preventing the circulating refrigerant from returning to the compressor 125. Dehumidifying system 100 also includes a condensate receptacle 145 for collecting condensate generated by evaporator 120 within refrigeration unit 103.

Both of circulation unit 101 and refrigeration unit 103 are controlled by a controller 130, which is operatively coupled to motor 110 and compressor 125. Controller 130 controls a speed at which motor 110 operates, which consequently determines a rotational speed of fan 105. Controller 130 additionally controls a speed at which compressor 125 operates, which consequently determines a flow rate of refrigerant through evaporator 120 and condenser 115. In various embodiments, controller 130 may operate according to one or more preset modes and/or conditions. In various implementations, the preset modes may include, but are not limited to, maximal capacity, maximal efficiency, defrost, etc. In various implementations, maximal capacity is defined in pints per day of water removal by dehumidifying system 100. In various implementations, maximal efficiency is defined in liters of water removed per kilowatt hour by dehumidifying system 100. In various implementations, at least one of the maximal capacity and maximal efficiency preset modes may be based on a capacity and/or efficiency rating associated with one or more components within dehumidifying system 100. In various embodiments, one or more matrices can be generated to optimize for capacity and/or efficiency. In various implementations, one or more optimization matrices may be generated by treating each capacity and/or efficiency rating corresponding to each respective component within dehumidifying system as an interdependent variable and sequentially iterating through various operative settings of dehumidifying system 100. The resultant overall efficiency and/or capacity of dehumidifying system 100 from each operative iteration can then be used as an entry within the one or more optimization matrices. Entries within the one or more optimization matrices can then be used to identify a maximal capacity and/or maximal efficiency corresponding of dehumidifying system 100. In various implementations, preset conditions may include one or more thresholds for temperature, humidity, etc.

Controller 130 is also operatively coupled to and receives input from ambient sensors 135 configured to sense ambient conditions and a user interface 140 configured to facilitate adjustment of settings associated with controller 130. In various embodiments, controller 130 may be a non-transitory computer readable medium or processor, having computer-readable instructions stored thereon that when executed cause the controller 130 to carry out operations called for by the instructions. In various embodiments, controller 130 may be a thermostat or other computing device. In yet other embodiments, the controller 130 may be configured as part of a data cloud configured to receive commands from a user control device and/or a remote computing device. Controller 130 may include a power source, a memory, a communications interface, and a processor. In other embodiments, controller 130 may include additional, fewer, and/or different components. Controller 130 includes sensors 127 and 129, which are in communication with circulation unit 101 and refrigeration unit 103, respectively. Sensors 127 and 129 are configured to measure conditions related to at least circulation unit 101 and refrigeration unit 103 and may include, but are not limited to, temperature, humidity, and current draw.

Ambient sensors 135 may include temperature sensors, humidity sensors, or any other sensors known in the art that are configured to sense ambient conditions. In various embodiments, controller 130 controls circulation unit 101 (via motor 110) and refrigeration unit 103 (via compressor 125) based on ambient conditions sensed by ambient sensors 135. In various implementations, ambient conditions sensed by ambient sensors 135 may be compared to preset modes and/or conditions by controller 130 to inform control of motor 110 and/or compressor 125.

User interface 140 may include one or more mechanisms for receiving inputs for adjusting settings associated with controller 130. In various embodiments, user interface 140 may include one or more buttons, switches, knobs, dials, touchpads, infrared receivers, or a combination thereof. Controller 130 settings may include operating parameters for dehumidifying system 100, which may further include, but are not limited to, a target dehumidification level, a threshold humidity level, etc. In various embodiments, controller 130 settings may include one or more preset modes (e.g., maximal capacity, maximal efficiency, defrost) and/or preset conditions (e.g., current draw limit, operational time limit). In various embodiments, user interface 140 may include a display (e.g., liquid crystal, light-emitting diode, etc.). In various embodiments, user interface may display ambient conditions sensed by ambient sensors 135, an indication of a preset mode and/or condition, etc.

Dehumidifying system 100 may draw current from an external power source via an electrical circuit moderated by a circuit breaker. Increased dehumidification demand (e.g., based on ambient conditions, preset modes and/or conditions, received input, etc.) on dehumidifying system 100 increases current draw by the system 100, as necessary speed increases of motor 110 and/or compressor 125 correspond to increased current draw by motor 110 and/or compressor 125, respectively. In various embodiments, controller 130 may adjust speeds of motor 110 and/or compressor 125 based on a current draw as excessive current draw by dehumidifying system 100 can adversely affect the electrical circuit and/or dehumidifying system 100, and/or trip the circuit breaker. In various embodiments, the controller 130 may determine a current draw associated with each of the circulation unit 101 and refrigeration unit 103 via current sensors 127 and 129, respectively. In various embodiments, sensors 127 and 129 may be in communication with motor 110 and compressor 125, respectively. In various other embodiments, sensors 127 and 129 may be incorporated within and/or part of the control software and/or components of controller 130 or separately arranged within the system 100 (as shown in FIG. 1).

Figure 2:
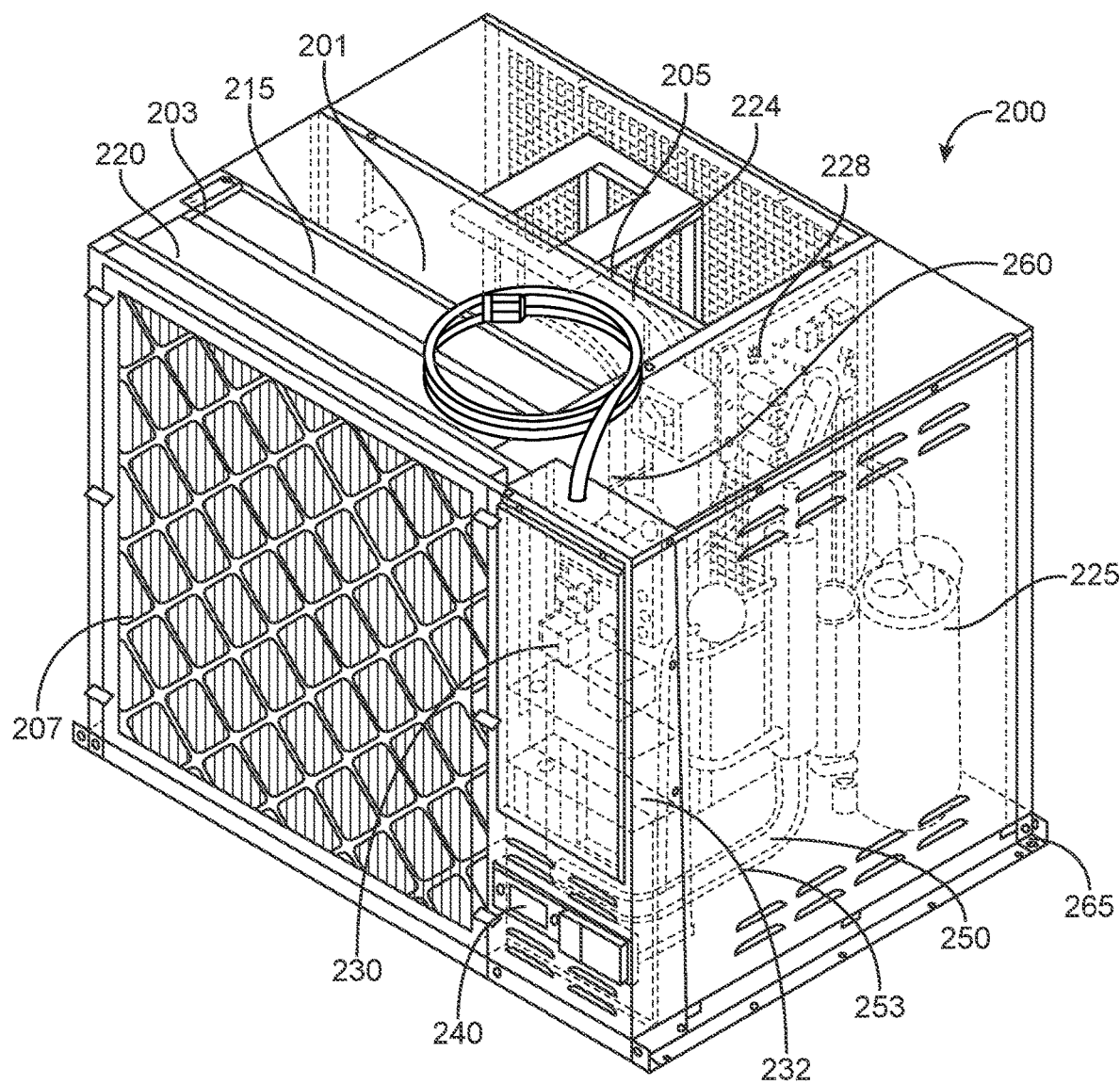
FIG. 2 is a perspective view of internal components of a dehumidifying system according to an exemplary embodiment.
Figure 3:
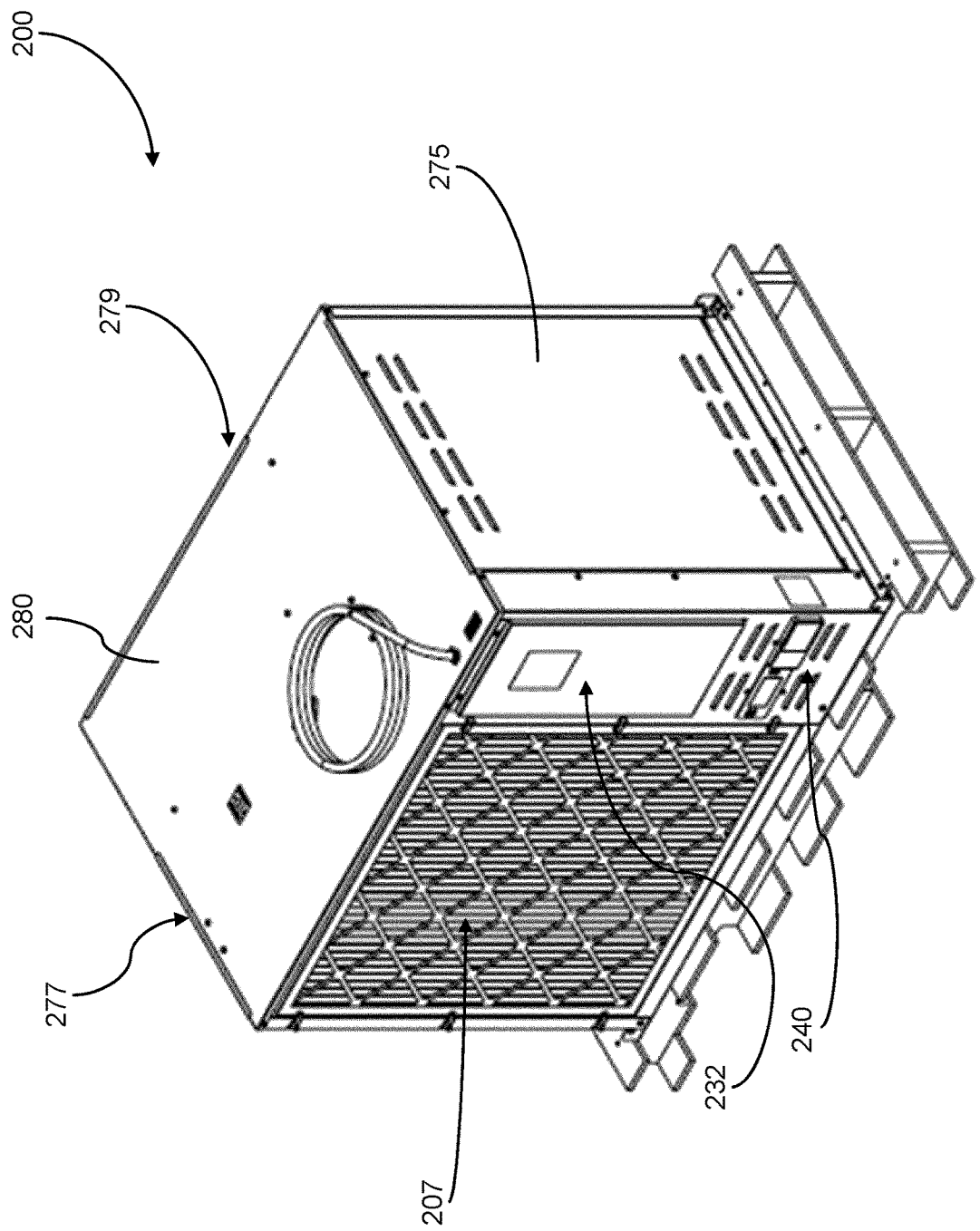
FIG. 3 is a perspective view of the dehumidifying system according of FIG. 2 according to an exemplary embodiment.

FIGS. 2 and 3 show perspective views of a dehumidifying system 200, according to various exemplary embodiments. As shown, dehumidifying system 200 includes a circulation unit 201 and a refrigeration unit 203. Circulation unit 201 include a fan 205, which pulls air through the dehumidifying system 200 via an air intake 207. Refrigeration unit 203 includes condenser 215 and evaporator 220, which are fluidly coupled to a compressor 225. Fan 205 is coupled to and controlled by a drive board 224, which includes one or more sensors (e.g., similar or equivalent to sensor 127). In various embodiments, the one or more sensors within the fan drive board 224 may include, but are not limited to, a current sensor and/or an ambient sensor. Condenser 215 and evaporator 220 are configured to circulate a refrigerant (e.g., working fluid, gas, or coolant) therein. Circulation of the refrigerant within condenser 215 and evaporator 220 is facilitated by compressor 225. Compressor 225 is operatively coupled to a compressor drive board 228, which includes one or more sensors (e.g., similar or equivalent to sensor 129). In various embodiments, the one or more sensors within the compressor drive board 228 may include, but are not limited to, a current sensor and/or an ambient sensor. Operation of circulation unit 201 and/or refrigeration 203 is controlled by a controller 230 located within a control unit 232, which is operatively coupled to the fan and compressor drive boards, 224 and 228, respectively. Consequently, operation of fan 205, condenser 215, and/or evaporator 220 may be controlled by controller 230. Control unit 232 is operatively coupled to a user interface 240, which enables selection of one or more preset modes, commands, and/or conditions. Preset modes may include, but are not limited to, maximal capacity, maximal efficiency, defrost cycle, etc. Commands and/or preset conditions may include, but are not limited to, one or more thresholds for temperature, humidity, etc. As shown, compressor 225 is fluidly coupled to evaporator 220 via a suction line 250, which includes a sensor 253. In various embodiments, sensor 253 may be a temperature sensor. A flow of refrigerant through compressor 225 is determined, at least in part, by a metering device 260, which is fluidly coupled between condenser 215 and evaporator 220. The metering device 260 may include one or more thermal expansion valves and/or cap tubes. Metering device 260 may control circulation of refrigerant between the condenser 215 and the evaporator 220 by causing a pressure drop between the condenser 215 and the evaporator 220 such that the circulating refrigerant can be boiled off, thereby cooling the evaporator 220 and preventing the circulating refrigerant from returning to the compressor 225. Dehumidifying system 200 may also include one or more bottom panels or a base 265.

Figure 4:
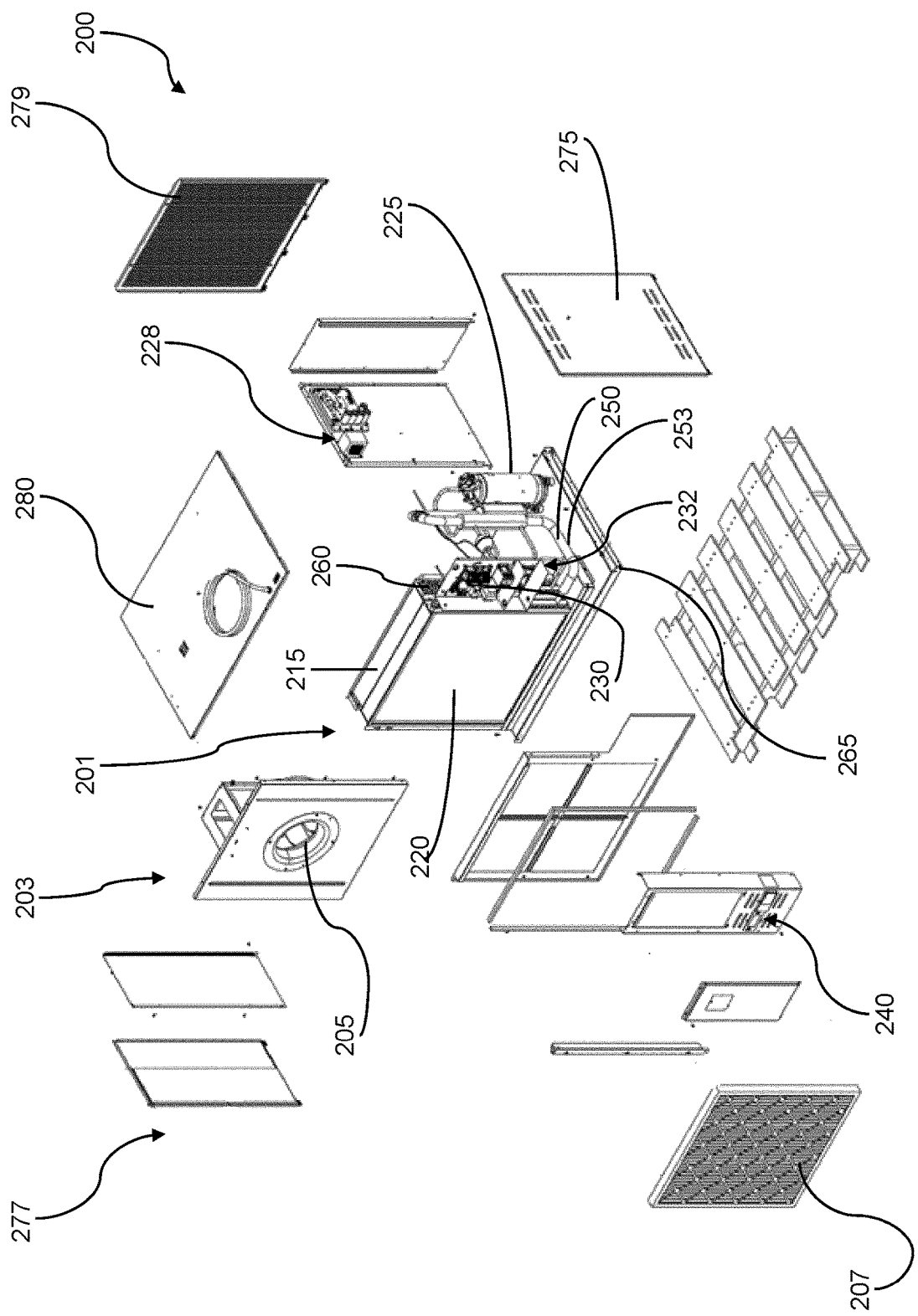
FIG. 4 is an exploded view of the dehumidifying system of FIG. 2 according to an exemplary embodiment.

As shown in FIG. 3, components within dehumidifying system 200 may be contained within an outer housing, which includes side panels 275 and 277, rear panel 279, and top panel 280. Air inlet 207, control unit 232, and user interface 240 form a front enclosing portion of dehumidifying system 200, which is coupled to side panels 275 and 277 and base 265. FIG. 4 shows an exploded view of dehumidifying system 200, which illustrates relative configurations of components within dehumidifying system 200 (i.e., contained with the outer housing) according to an exemplary embodiment.

Figure 5:
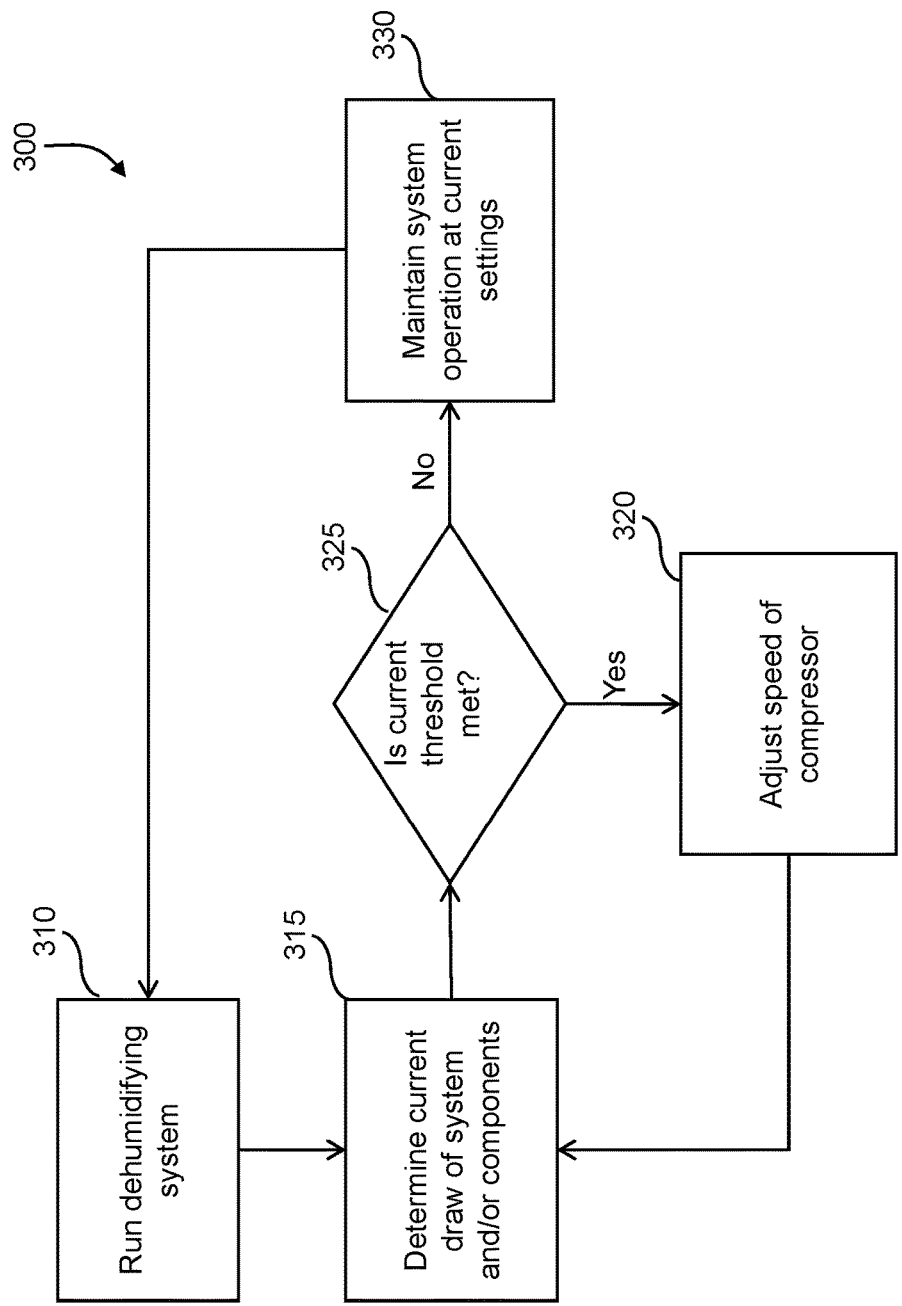
FIG. 5 is a flow diagram illustrating operations performed by a dehumidifying system in accordance with an exemplary embodiment.

FIG. 5 shows a flow diagram illustrating a method 300 performed by dehumidifying system 100 according to an exemplary embodiment. In other embodiments, method 300 may be performed by dehumidifying system 200. In operation 310, dehumidifying system 100 runs in response to an input received by controller 130. Controller 130 may receive the input from ambient sensors 135 and/or user interface 140. An input from ambient sensors 135 may include, but is not limited to, ambient conditions such as an ambient temperature and/or an ambient humidity. An input received by controller 130 from user interface 140 may include, but is not limited to, selection of one or more preset modes, commands, and/or conditions. Preset modes may include, but are not limited to, maximal capacity, maximal efficiency, defrost cycle, etc. Commands and/or preset conditions may include, but are not limited to, one or more thresholds for temperature, humidity, etc. In various embodiments, controller 130 may operate based on ambient conditions sensed by ambient sensors 135, one or more preset modes and/or conditions, or a combination thereof. In operation 315, controller 130 determines a current draw of dehumidifying system 100. In various embodiments, controller 130 determines a current draw associated with at least one of motor 110 (via sensor 127) and compressor 125 (via sensor 129). In operation 325, controller 130 compares the current draw of dehumidifying system 100 (and/or of one or more of its components) to a current threshold. The current threshold may be predetermined or may be variable based on environmental conditions and/or other operating parameters and conditions. In various implementations, the current threshold may be based on a maximum voltage and/or current, wherein the maximum voltage and/or current is based on one or more losses corresponding to one or more respective components within dehumidifying system 100. In these implementations, the one or more losses may be determined and/or adjusted based on an operating voltage and/or current. In various implementations, a line voltage output from a component within the dehumidifying system 100 (e.g., fan 105) could inform adjustment the one or more losses based on the operating voltage and/or current. In various embodiments, the threshold may be based on a current limit of the electrical circuit. For example, the threshold may be 23.5 amperes for a 30 ampere electrical circuit. In various embodiments, the threshold may be below or the same as the current limit of the electrical circuit. If controller 130 determines that the current draw of dehumidifying system 100 meets the threshold ("Yes"), the controller 130 may consequently adjust the speed of compressor 125 in operation 320. If controller 130 determines that the current draw of dehumidifying system 100 does not meet the predetermined threshold ("No"), the controller 130 may maintain or increase the speed of compressor 125 in operation 330. If it is determined by controller 130 that the current draw does not meet the threshold (operation 325) and system settings are maintained in operation 330, the controller 130 will operate system 100 accordingly and return to operation 310.

In various embodiments, controller 130 may increase the speed of compressor 125 based on more than one current threshold, wherein controller 130 may reduce a speed of compressor 125 (in operation 320) if the current draw is determined to meet a first current threshold (in operation 325) and may increase a speed of compressor 125 (in operation 320) if the current draw is determined to meet a second threshold (in operation 325). For example, controller 130 may reduce the speed of compressor 125 if the current draw meets a 23.5 ampere threshold and may increase the speed of compressor 125 if the current draw meets a 22.5 ampere threshold (for a 30 ampere electrical circuit). In various embodiments, at least one current threshold may be variable based on a rate of change of current draw as determined by controller 130.

Operations 310, 315, and 325 may be iteratively carried out by controller 130. In various embodiments, method 300 may be repeated periodically based on a predetermined time increment, temperature measurement, humidity measurement, and/or input received by user interface 140. In some embodiments, operations 310, 315, and 325 may be iteratively carried out by controller 130 according to a set, invariable time increment (e.g., every 10 seconds). In various embodiments, controller 130 may adjust the speed of compressor 125 in operation 320 based a predetermined speed increment. In some embodiments, controller 130 may adjust the speed of compressor 125 in operation 320 based on a set, invariable speed increment. For example, controller 130 may reduce the speed of compressor 125 in 2 Hz increments and/or increase the speed of compressor 125 in 1 Hz increments. In various embodiments, an increment of speed adjustment of compressor 125 by controller 130 may be variable based on rate of change of current draw corresponding to each speed adjustment. In various embodiments wherein controller 130 determines the current draw of dehumidifying system 100 meets the threshold in operation 325, the controller 130 may consequently reduce the speed of compressor 125 to a preset speed in operation 320. In other embodiments wherein controller 130 determines the current draw of dehumidifying system 100 meets the threshold in operation 325, the controller 130 may reduce the speed of compressor 125 by a set increment (e.g., 1 Hz, 2 Hz, 5 Hz, etc.) in operation 320. In various embodiments wherein the controller 130 adjusts the speed of compressor 125 in operation 320, controller 130 may wait a period of time (e.g., 3 seconds, 10 seconds, 30 seconds, etc.) before determining the current draw of dehumidifying system 100 (operation 315) and comparing it to the predetermined threshold (operation 325). In various embodiments, controller 130 may determine the current draw of dehumidifying system 100 periodically (e.g., even after determining the current draw does not meet the threshold in operation 325).

In various embodiments, controller 130 may iterate through operations 315, 325, and 320 to maximize the dehumidification capacity of dehumidifying system 100. For example, controller 130 may increase the speed of compressor 125 to increase dehumidifying capacity until the current threshold is met in operation 325. Controller 130 may then iteratively reduce the speed of compressor 125 until the current threshold is no longer met. In various embodiments, controller 130 may iterate through operations 315, 325, and 320 to maximize the dehumidification efficiency of dehumidifying system 100.

In various embodiments, the electrical circuit current limit is determined and/or set during installation of dehumidifying system 100. In various embodiments, the controller 130 may determine that the current draw of dehumidifying system 100 meets the threshold if the current draw is the same as the electrical circuit current limit. In other embodiments, the controller 130 may determine the current draw of dehumidifying system 100 meets the threshold if the current draw is within a specified range below the electrical circuit current limit. In other embodiments, the controller 130 may determine that the current draw of dehumidifying system 100 meets the threshold based on a trend in the current draw.

Figure 6:
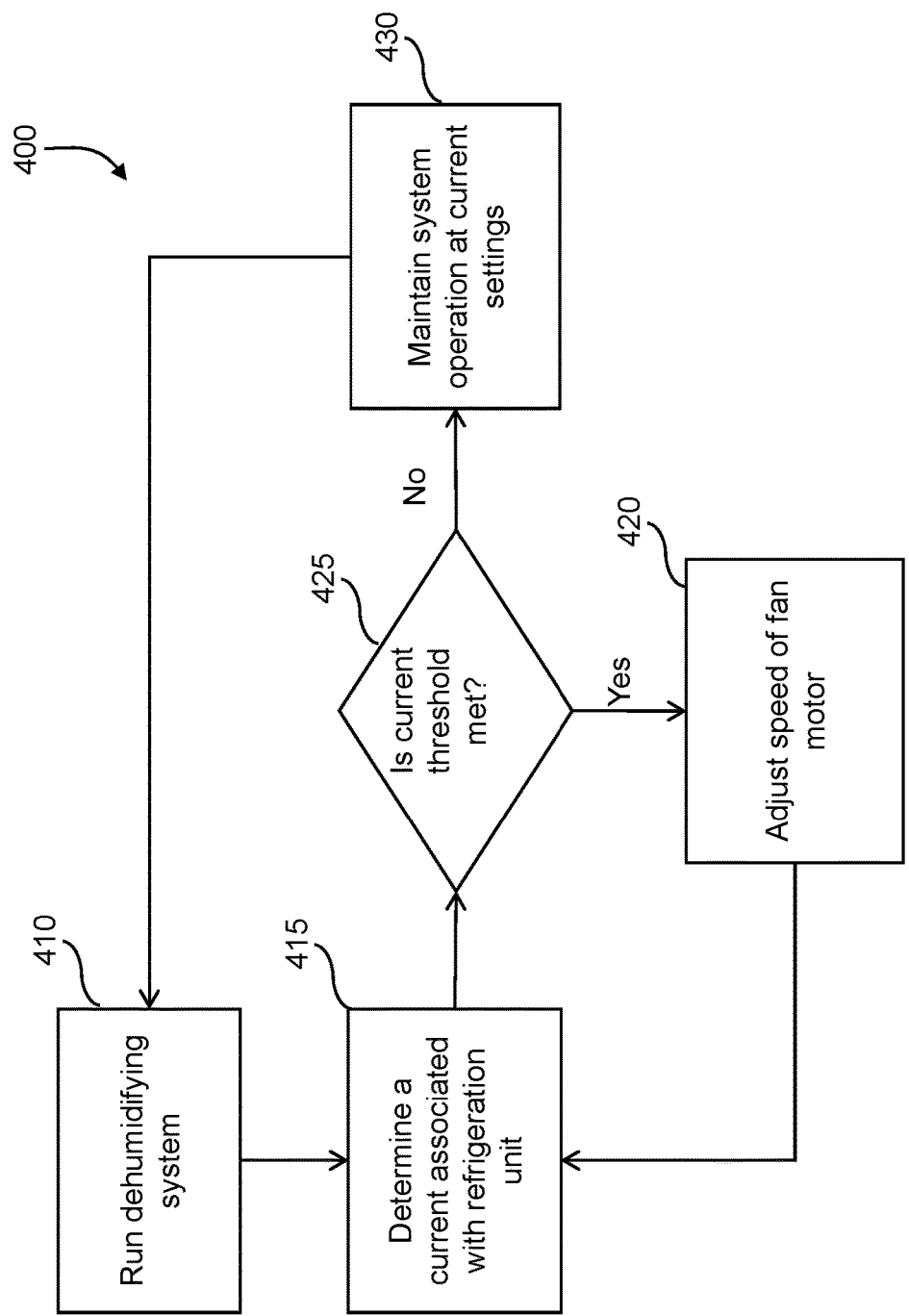
FIG. 6 is a flow diagram illustrating operations performed by a dehumidifying system in accordance with an exemplary embodiment.

As previously described, airflow through system 100 is controlled, at least in part, by fan 105 (via motor 110). Reduced or restricted airflow through dehumidifying system 100 may result in increased head pressure and reduced heat transfer within condenser 115. FIG. 6 shows a flow diagram illustrating a method 400 performed by dehumidifying system 100 according to an exemplary embodiment. In various other embodiments, method 300 may be performed by dehumidifying system 200. In method 400, operations 410, 415, 425, and 430 are substantially equivalent to the corresponding operations 310, 315, 325, and 330 of method 300. In operation 410, dehumidifying system 100 runs in response to an input received by controller 130. Controller 130 may receive the input from ambient sensors 135 and/or user interface 140. An input from ambient sensors 135 may include, but is not limited to, ambient conditions such as an ambient temperature and/or an ambient humidity. An input received by controller 130 from user interface 140 may include, but is not limited to, selection of one or more preset modes, commands, and/or conditions. Preset modes may include, but are not limited to, maximal capacity, maximal efficiency, defrost cycle, etc. Commands and/or preset conditions may include, but are not limited to, one or more thresholds for temperature, humidity, etc. In various embodiments, controller 130 may operate based on ambient conditions sensed by ambient sensors 135, one or more preset modes and/or conditions, or a combination thereof. In operation 415, controller 130 determines a current draw of dehumidifying system 100. In various embodiments, controller 130 determines a current draw associated with at least one of motor 110 (via sensor 127) and compressor 125 (via sensor 129). In operation 425, controller 130 compares the current draw of dehumidifying system 100 (and/or of one or more of its components) to a current threshold. The threshold may be predetermined or may be variable based on environmental conditions and/or other operating parameters and conditions. In various embodiments, the threshold may be based on a current limit of the electrical circuit. In various embodiments, the threshold may be below or the same as the current limit of the electrical circuit. If controller 130 determines that the current draw of dehumidifying system 100 meets the threshold ("Yes"), the controller 130 may consequently increase the speed of motor 110 in operation 420. An increase in the speed of fan 105 may cause an increased airflow through dehumidifying system 100 and, consequently, cause a decrease in discharge pressure. In various other embodiments, an increase in the speed of fan 105 may cause increased heat transfer in condenser 115. If controller 130 determines that the current draw of dehumidifying system 100 does not meet the predetermined threshold ("No"), the controller 130 may maintain or decrease the speed of motor 110 in operation 430. If it is determined by controller 130 that the current draw does not meet the threshold (operation 425) and system settings are maintained in operation 430, the controller 130 will operate system 100 accordingly and return to operation 410. Operations 410, 415, and 425 may be iteratively carried out by controller 130. In various embodiments, method 400 may be repeated periodically based on a predetermined time increment, temperature measurement, humidity measurement, and/or input received by user interface 140.

In various embodiments, operations 415, 420, and 425 may be iteratively carried out by controller 130. In various embodiments wherein controller 130 determines the current draw of dehumidifying system 100 meets the threshold in operation 425, the controller 130 may consequently increase the speed of motor 110 to a preset speed in operation 420. In other embodiments wherein controller 130 determines the current draw of dehumidifying system 100 meets the threshold in operation 425, the controller 130 may increase the speed of motor 110 by a set increment (e.g., 5 rpm, 20 rpm, 50 rpm, etc.) in operation 420. In various embodiments wherein the controller 130 adjusts the speed of motor 110 in operation 420, controller 130 may wait a period of time (e.g., 3 seconds, 10 seconds, 30 seconds, etc.) before determining the current draw of dehumidifying system 100 (operation 415) and comparing it to the predetermined threshold (operation 425). In various embodiments, controller 130 may repeat operation 415 periodically to determine the current draw of dehumidifying system 100 (e.g., even after determining the current draw does not meet the threshold in operation 425).

In various embodiments, controller 130 may be operatively coupled to one or more airflow sensors within dehumidifying system 100. In various embodiments, controller 130 may iterate through operations 415, 425, and 420 to compensate for a blockage in one or more filters within dehumidifying system 100. For example, controller 130 may increase the speed of motor 110 to increase airflow through dehumidifying system 100. Controller 130 may then iteratively reduce the speed of motor 110 until the current threshold is no longer met.

As previously described, airflow through system 100 is controlled, at least in part, by fan 105 (via motor 110). Reduced or restricted airflow through dehumidifying system 100 may result in increased head pressure and reduced heat transfer within condenser 115. Accordingly, in various alternate embodiments, controller 130 may be configured to determine a pressure within dehumidifying system in operation 415. The determined pressure may correspond to a head pressure and/or a discharge pressure associated with condenser 115. In these embodiments, controller 130 may determine if a pressure threshold is met in operation 425 and consequently adjust the speed of fan 105 (via motor 110) in operation 420. In various embodiments, controller 130 may increase the speed of fan 105 (via motor 110) if the pressure threshold is met in operation 425.

Figure 7:
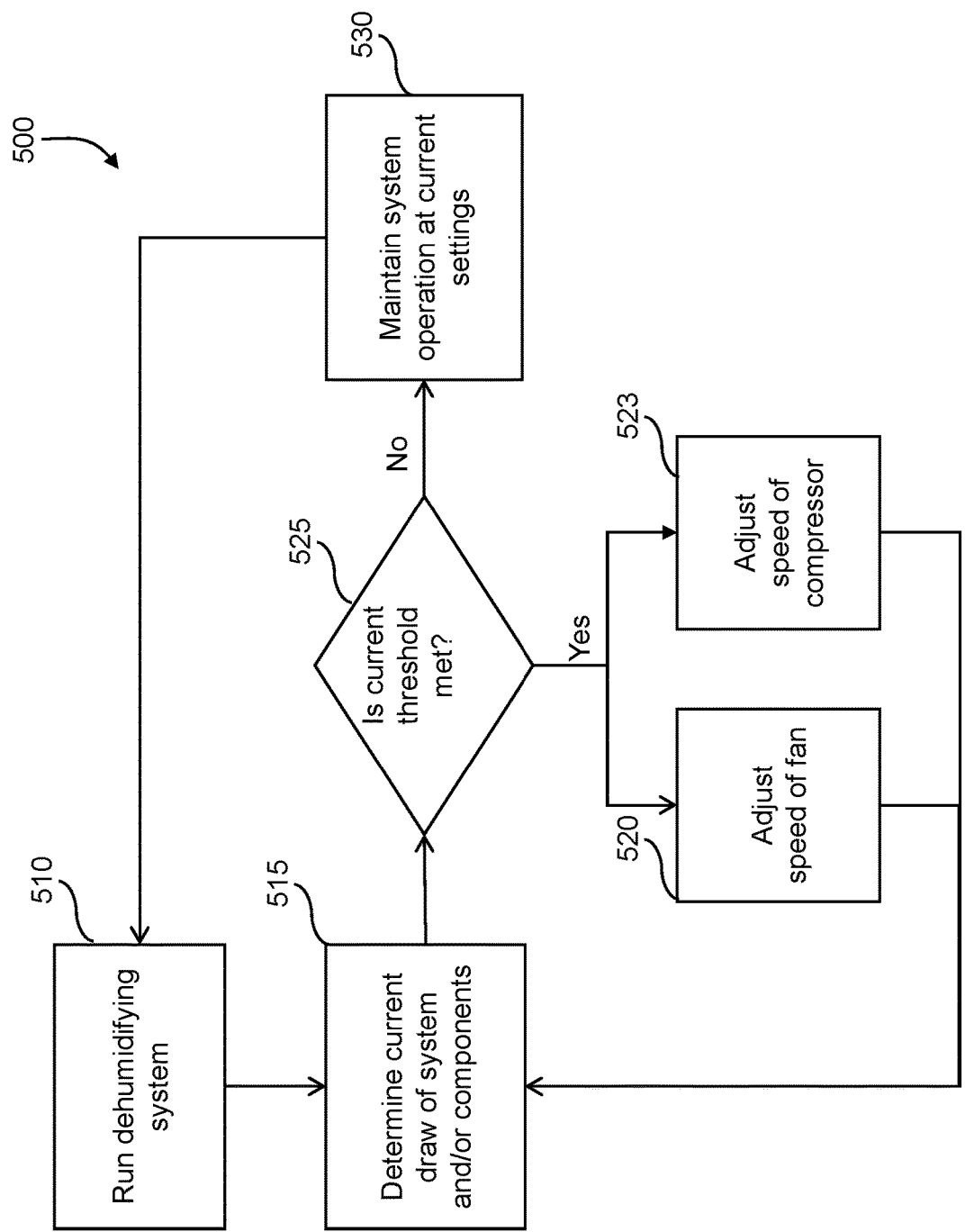
FIG. 7 is a flow diagram illustrating operations performed by a dehumidifying system in accordance with an exemplary embodiment.

FIG. 7 shows a flow diagram illustrating a method 500 performed by dehumidifying system 100 according to an exemplary embodiment. In various embodiments, method 500 may be performed by dehumidifying system 200. In operation 510, dehumidifying system 100 runs in response to an input received by controller 130. Controller 130 may receive the input from ambient sensors 135 and/or user interface 140. An input from ambient sensors 135 may include, but is not limited to, one or more ambient conditions such as an ambient temperature and/or an ambient humidity. An input received by controller 130 from user interface 140 may include, but is not limited to, selection of one or more preset modes, commands, and/or conditions. Preset modes may include, but are not limited to, maximal capacity, maximal efficiency, defrost cycle, etc. Commands and/or preset conditions may include, but are not limited to, one or more thresholds for temperature, humidity, etc. In various embodiments, controller 130 may operate based on ambient conditions sensed by ambient sensors 135, one or more preset modes and/or conditions, or a combination thereof. In operation 515, controller 130 determines a current draw of dehumidifying system 100. In various embodiments the determined current draw may be associated with at least one of motor 110 (via sensor 127) and compressor 125 (via sensor 129). In operation 525, controller 130 may compare the determined current draw (e.g., of dehumidifying system 100 and/or of one or more of its components) to a current threshold. The threshold may be predetermined or may be variable based on environmental conditions and/or other operating parameters and conditions. In various implementations, the current threshold may be based on a maximum voltage and/or current, wherein the maximum voltage and/or current is based on one or more losses corresponding to one or more respective components within dehumidifying system 100. In these implementations, the one or more losses may be determined and/or adjusted based on an operating voltage and/or current. In various implementations, a line voltage output from a component within the dehumidifying system 100 (e.g., fan 105) could inform adjustment the one or more losses based on the operating voltage and/or current. In various embodiments, the threshold may be based on a current limit of the electrical circuit. In various embodiments, the threshold may be below or the same as the current limit of the electrical circuit. If controller 130 determines that the current draw of dehumidifying system 100 meets the threshold ("Yes"), the controller 130 may adjust the speed of motor 110 (operation 420) and compressor 125 (operation 523). In various embodiments, controller 130 is operatively coupled to one or more airflow sensors within dehumidifying system 100. In various embodiments, adjusting the speed of motor 110 and compressor 125 may be based in part on a detected airflow by the one or more airflow sensors operatively coupled to controller 130.

FIG. 7 shows operations 520 and 523 in parallel. In various other embodiments, operations 520 and 523 may be carried out sequentially in any order. If controller 130 determines that the current draw of dehumidifying system 100 does not meet the threshold ("No"), the controller 130 may maintain or increase the speeds of motor 110 and/or compressor 125 in operation 530. In various embodiments, the controller 130 may determine that the current draw of dehumidifying system 100 meets the threshold if the current draw is the same as the electrical circuit current limit. In other embodiments, the controller 130 may determine the current draw of dehumidifying system 100 meets the threshold if the current draw is within a specified range below the electrical circuit current limit. In other embodiments, the controller 130 may determine the current draw of dehumidifying system 100 meets the threshold based on a trend in the current draw. If it is determined by controller 130 that the current draw does not meet the threshold (operation 525), controller 130 may maintain or increase system settings (e.g., speeds of motor 110 and/or compressor 125) and return to operation 510. Operations 510, 515, and 525 may be iteratively carried out by controller 130. In various embodiments, method 500 may be repeated periodically based on a predetermined time increment, temperature measurement, humidity measurement, and/or input received by user interface 140.

In various embodiments, operations 515, 520, and 525 may be iteratively carried out by controller 130. In various embodiments wherein controller 130 determines the current draw of dehumidifying system 100 meets the threshold in operation 525, the controller 130 may consequently reduce the speed of each of motor 110 and compressor 125 to a preset speed in operation 515. In other embodiments wherein controller 130 determines the current draw of dehumidifying system 100 meets the threshold in operation 525, the controller 130 may reduce the speed of motor 110 and compressor 125 each by a set increment (e.g., 1 Hz, 2 Hz, 5 Hz, etc.) in operation 515. The set increment of speed reduction may be the same or different for each of the motor 110 and compressor 125. In various embodiments wherein the controller 130 adjusts the speed of motor 110 and compressor 125 (operation 515), controller 130 may wait a period of time (e.g., 3 seconds, 10 seconds, 30 seconds, etc.) before determining the current draw of dehumidifying system 100 (operation 520) and comparing it to the predetermined threshold (operation 525). In various embodiments, controller 130 may determine the current draw of dehumidifying system 100 periodically (e.g., even after determining the current draw does not meet the threshold in operation 525).

In various other embodiments, speed adjustments of motor 110 and compressor 125 may be carried out alternately by controller 130. In various embodiments, controller 130 may iterate through operations 515 and 525 and subsequently adjust a speed of compressor 125 (operation 523). In a subsequently iteration, controller 130 may adjust a speed of motor 110 (operation 520). In various embodiments, the speed of motor 110 may be adjusted and/or matched to correspond to the speed of compressor 125. In some embodiments, the speed of motor 110 may be matched to correspond to the speed of compressor 125 to moderate airflow changes (and, consequently, heat transfer ratios) within dehumidifying system 100.

Figure 8:
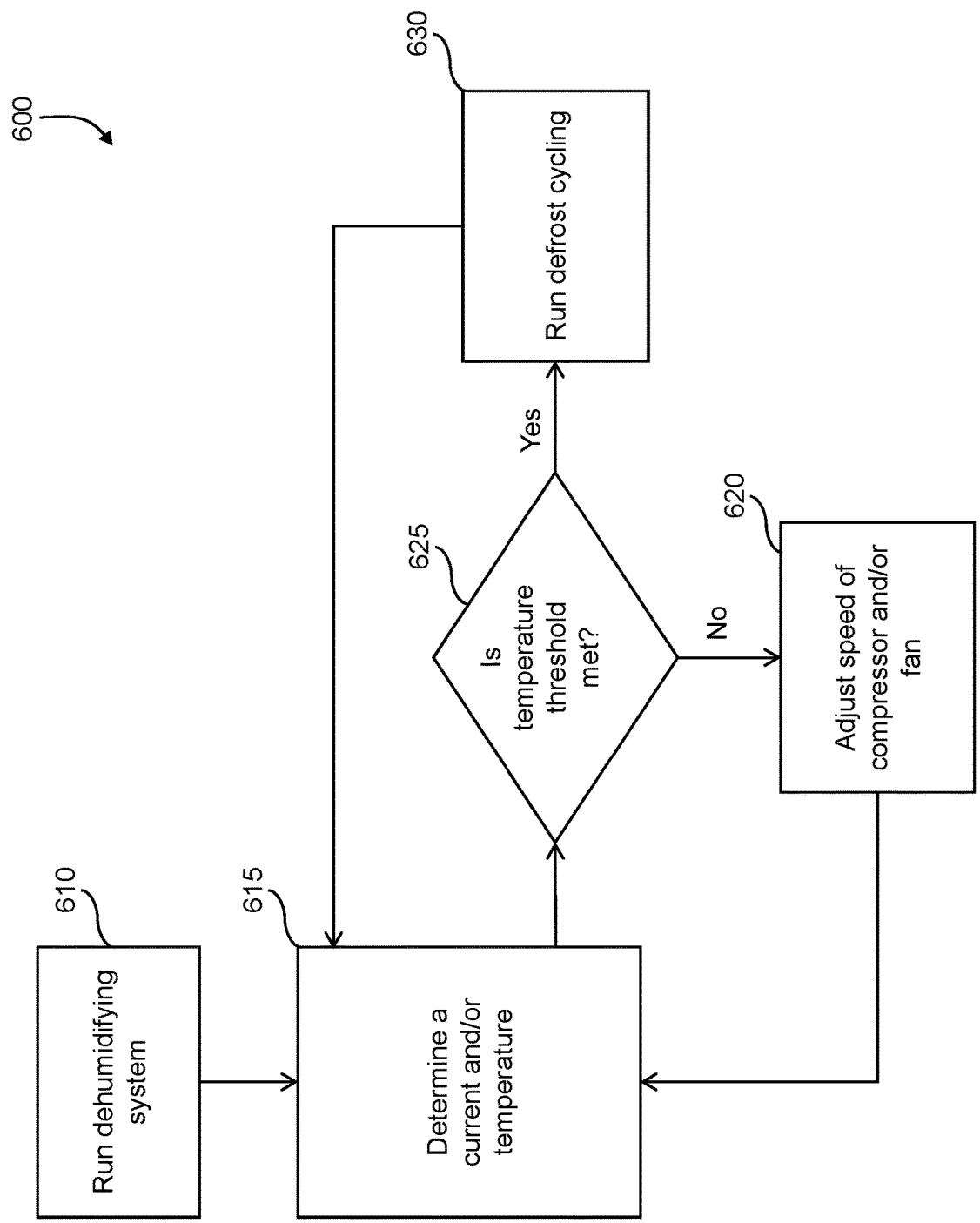
FIG. 8 is a flow diagram illustrating operations performed by a dehumidifying system in accordance with an exemplary embodiment.

FIG. 8 shows a flow diagram illustrating a method 600 performed by dehumidifying system 100 according to an exemplary embodiment. In various embodiments, method 600 may be performed by dehumidifying system 200. In operation 610, dehumidifying system 100 runs in response to input is received by controller 130. Controller 130 may receive the input from ambient sensors 135 and/or user interface 140. An input from ambient sensors 135 may include, but is not limited to, one or more ambient conditions such as an ambient temperature and/or an ambient humidity. An input received by controller 130 from user interface 140 may include, but is not limited to, selection of one or more preset modes, commands, and/or conditions. Preset modes may include, but are not limited to, maximal capacity, maximal efficiency, defrost cycle, etc. Commands and/or preset conditions may include, but are not limited to, one or more thresholds for temperature, humidity, etc. In various embodiments, controller 130 may operate based on ambient conditions sensed by ambient sensors 135, one or more preset modes and/or conditions, or a combination thereof. In operation 615, controller 130 determines a temperature associated with a component within dehumidifying system 100 (e.g., via sensors 127 and/or 129). In various embodiments, controller 130 may determine a temperature associated with a suction line (e.g., within compressor 125) and/or a coil (e.g., within evaporator 120). In various embodiments, controller 130 may determine the temperature of a component within dehumidifying system 100 via one or more sensors mounted on or near the component. In operation 625, controller 130 may compare the determined component temperature to a temperature threshold. The temperature threshold may be predetermined or may be variable based on environmental conditions and/or other operating parameters and conditions. In various implementations, the temperature threshold may be empirically determined based on experimental analysis. In other implementations the temperature threshold may be determined based on an optimization matrix. In various implementations, the current threshold may be based on a maximum voltage and/or current, wherein the maximum voltage and/or current is based on one or more losses corresponding to one or more respective components within dehumidifying system 100. In these implementations, the one or more losses may be determined and/or adjusted based on an operating voltage and/or current. In various implementations, a line voltage output from a component within the dehumidifying system 100 (e.g., fan 105) could inform adjustment the one or more losses based on the operating voltage and/or current. In various embodiments, the temperature threshold may be based on the freezing temperature of water, an ambient air temperature, an operating temperature limit defined by a manufacturer, an input received by controller 130, etc. If controller 130 determines that the component temperature does not meet the temperature threshold ("No"), the controller 130 may maintain or adjust the speed of at least one of motor 110 and compressor 125 in operation 620 (e.g., based on at least one of ambient conditions, one or more preset modes and/or conditions, a current draw of dehumidifying system 100, or a combination thereof). In various embodiments, controller 130 may determine that the component temperature is trending toward the temperature threshold (e.g., component temperature is decreasing) and controller 130 may consequently adjust at least one of the motor 110 and compressor 125 to halt, slow, or reverse the trend in operation 615. Adjusting the speed of at least one of the motor 110 and compressor 125 to halt, slow, or reverse a decrease in component temperature may delay the need for defrost cycling of dehumidifying system 100. Delaying the need or onset of defrost cycling by adjustment of motor 110 and/or compressor 125 enables dehumidifying system 100 to operate within a greater range of ambient air temperature than without any adjustment. Enabling dehumidifying system 100 to operate within a wide range of ambient air temperature translates to an improved dehumidification capacity compared to capacity during fixed speed operation.

If controller 130 determines in operation 625 that the component temperature meets the temperature threshold ("Yes"), the controller 130 causes dehumidifying system 100 to begin defrost cycling in operation 630. In various embodiments, the controller 130 may determine that the component temperature meets the temperature threshold if the component temperature is the same as the freezing temperature of water and/or an ambient air temperature. In various embodiments, dehumidifying system 100 may include one or more temperature sensors disposed within a suction line (coupled between evaporator 120 and compressor 125) and/or a coil inlet (e.g., coupled to evaporator 120 and/or condenser 115). In other embodiments, the controller 130 may determine the component temperature meets the temperature threshold if the component temperature is within a specified range below the freezing temperature of water and/or an ambient air temperature. In other embodiments, the controller 130 may determine the component temperature meets the temperature threshold based on a trend in the component temperature. In various embodiments, controller 130 may cause compressor 125 to cease operation during defrost cycling, thereby enabling ambient air to facilitate raising component temperature within dehumidifying system 100. After defrost cycling begins in operation 630, the controller 130 may return to operation 615 to again determine a temperature within dehumidifying system 100. In various embodiments, controller 130 may return to operation 615 (after operation 630) after a period of time (e.g., 3 seconds, 10 seconds, 30 seconds, etc.). Controller 130 may repeat operations 615, 625, 620, and 630 iteratively while dehumidifying system 100 runs.

In various embodiments, operations 615, 620, and 625 may be iteratively carried out by controller 130. In various embodiments wherein controller 130 determines the component temperature does not meet the temperature threshold (in operation 625) but is trending toward the predetermined temperature threshold (e.g., decreasing), the controller 130 may adjust (e.g., reduce) the speed of at least one of motor 110 and compressor 125 to a preset speed in operation 620. In other embodiments wherein controller 130 determines the component temperature does not meet the threshold (in operation 625) but is trending toward the temperature threshold (e.g., decreasing), the controller 130 may reduce the speed of at least one of motor 110 and compressor 125 by a set increment (e.g., 1 Hz, 2 Hz, 5 Hz, etc.) in operation 620. In various embodiments, controller 130 may increase the speeds of both motor 110 and compressor 125. In other embodiments, controller 130 may decrease the speeds of both motor 110 and compressor 125. In various embodiments, controller 130 may increase the speed of motor 110 and decrease the speed of compressor 125 or vice versa. The set increment of speed adjustment may be the same or different for each of the motor 110 and compressor 125. In various embodiments wherein the controller 130 adjusts the speed of at least one of motor 110 and compressor 125 (operation 620), controller 130 may wait a period of time (e.g., 3 seconds, 10 seconds, 30 seconds, etc.) before determining the component temperature (operation 615) and comparing it to the temperature threshold (operation 625). In various embodiments, controller 130 may determine the component temperature periodically (e.g., even after determining the temperature does not meet nor is trending toward the temperature threshold in operation 625).

Figure 9:
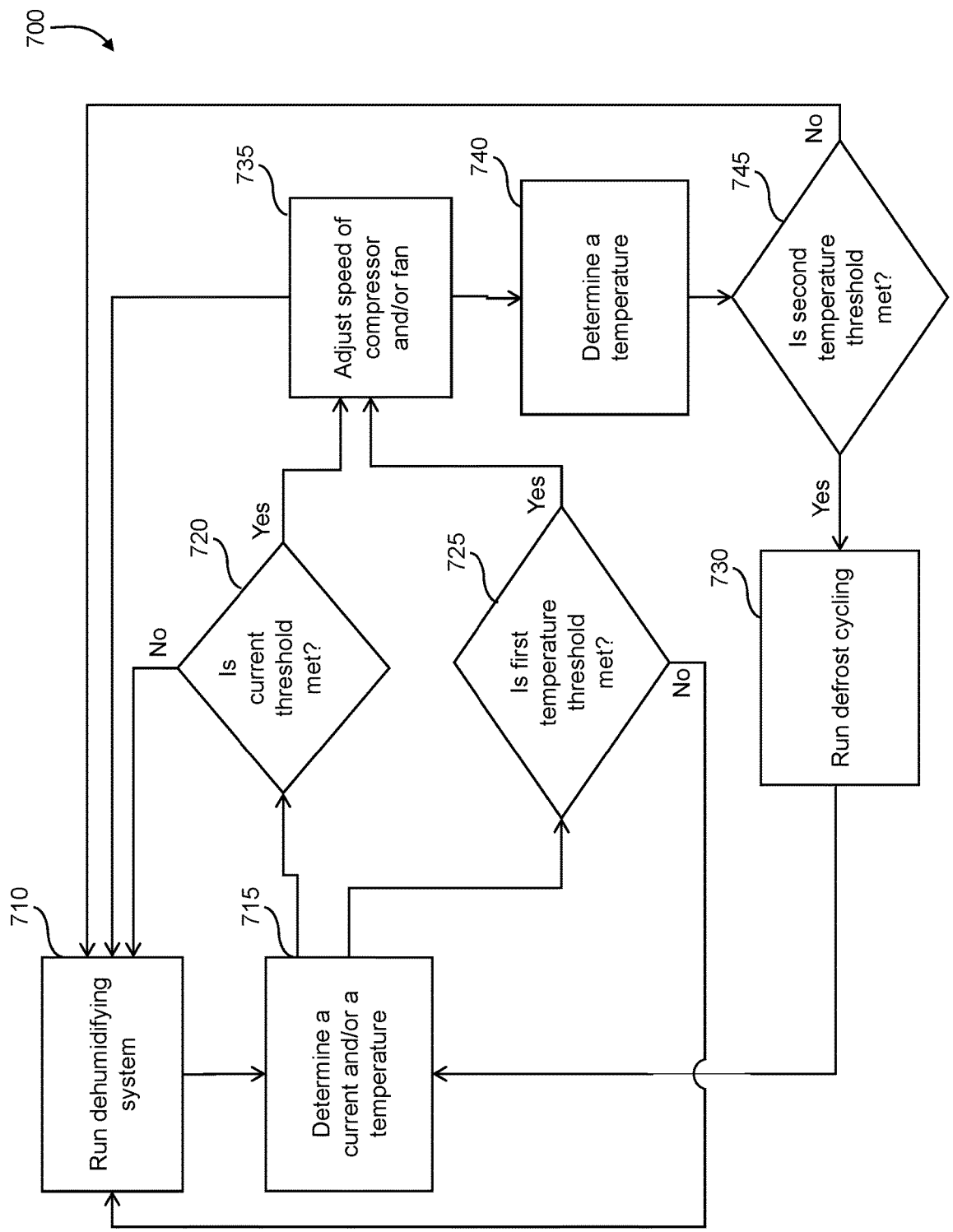
FIG. 9 is a flow diagram illustrating operations performed by a dehumidifying system in accordance with an exemplary embodiment.

FIG. 9 shows a flow diagram illustrating a method 700 performed by dehumidifying system 100 according to an exemplary embodiment. In various embodiments, method 700 may be performed by dehumidifying system 200. In operation 710, dehumidifying system 100 runs in response to input received by controller 130. Controller 130 may receive the input from ambient sensors 135 and/or user interface 140. An input from ambient sensors 135 may include, but is not limited to, ambient conditions such as an ambient temperature and/or an ambient humidity. An input received by controller 130 from user interface 140 may include, but is not limited to, selection of one or more preset modes, commands, and/or conditions. Preset modes may include, but are not limited to, maximal capacity, maximal efficiency, defrost cycle, etc. Commands and/or preset conditions may include, but are not limited to, one or more thresholds for temperature, humidity, etc. In various embodiments, controller 130 may operate based on ambient conditions sensed by ambient sensors 135, one or more preset modes and/or conditions, or a combination thereof.

Controller 130 may determine a current and/or a temperature measurement (e.g., via sensors 127, 129, and/or 135) associated with dehumidifying system 100 in operation 715. The current may correspond to a current draw associated with at least one of motor 110 (via sensor 127) and compressor 125 (via sensor 129). The temperature may correspond to an ambient temperature, a temperature internal to system 100, or a temperature of a component within system 100 (e.g., via a sensor within a suction line). After determining the current and/or temperature measurement in operation 715, controller 130 may compare the determined current to a current threshold in operation 720 and independently compare the determined temperature to a first temperature threshold in operation 725. If controller 130 determines in operation 720 that the current within dehumidifying system 100 does not meet the current threshold, controller 130 may maintain a speed of compressor 125 and/or motor 110 and return to operation 710. If controller 130 determines that the current within dehumidifying system 100 meets the current threshold, controller 130 may adjust the speed of compressor 125 and/or motor 110 in operation 735 and subsequently return to operation 710. Separate from operation 720, controller 130 may determine that the temperature within dehumidifying system 100 meets the first temperature threshold in operation 725 and subsequently proceed to operation 735, wherein controller 130 adjusts the speed of compressor 125 and/or motor 110. Controller 130 may subsequently determine the temperature within dehumidifying system 100 in operation 740. In various embodiments, controller 130 may wait a period of time (e.g., based on a preset mode, received input, etc.) after completing operation 735 before proceeding to operation 740. After determining the temperature in operation 740, controller 130 may then compare the temperature to a second temperature threshold. In various embodiments, the second temperature threshold is lower than the first temperature threshold. If controller 130 determines that the temperature does not meet the second temperature threshold in operation 745, controller 130 may return to operation 710. If controller 130 determines that the temperature meets the second temperature threshold in operation 745, controller 130 may initiate defrost cycling in operation 730. After running defrost cycling, controller 130 may return to operation 715 and again determine the temperature within system 100. In various embodiments, controller 130 may wait a period of time (e.g., based on a preset mode, received input, etc.) after completing operation 730 and proceeding to operation 715.

In various embodiments, operations 720 and 725 are carried out in parallel by controller 130. In various embodiments, operations 720 and 725 are carried out sequentially by controller 130. In various embodiments, controller 130 may prioritize a result of operation 720 over a result of operation 725 or vice versa.

In various embodiments, the current threshold, the first temperature threshold, and/or the second temperature threshold may be predetermined or may be variable based on environmental conditions and/or other operating parameters and conditions. In various implementations, the current threshold may be based on a maximum voltage and/or current, wherein the maximum voltage and/or current is based on one or more losses corresponding to one or more respective components within dehumidifying system 100. In these implementations, the one or more losses may be determined and/or adjusted based on an operating voltage and/or current. In various implementations, a line voltage output from a component within the dehumidifying system 100 (e.g., fan 105) could inform adjustment the one or more losses based on the operating voltage and/or current. In various embodiments, the first and/or second temperature threshold may correspond to the freezing temperature of water, an operating temperature limit defined by a manufacturer, and/or an input received by controller 130.

In various embodiments, controller 130 may increase the speed of at least one of compressor 125 and motor 110 in operation 735 to maximize dehumidifying capacity of system 100. In various embodiments, at least one of the first and second temperature thresholds may be based on at least one of a target capacity and a target efficiency. In various embodiments, the first and/or second temperature threshold may be based on or determined by an optimization matrix. In some embodiments, controller 130 may determine that determined temperature measurement is trending toward at least one of the first and second temperature threshold and, consequently, adjust the speed of compressor 125 and/or motor 110. In some embodiments wherein controller 130 determines that the temperature measurement does not meet the first and/or second temperature threshold and determines the current draw may be trending toward the current threshold, controller 130 may adjust the speed of both compressor 125 and motor 110. In yet other embodiments wherein controller 130 determines that neither the measured temperature nor the current draw meet the respective temperature and current thresholds, controller 130 may adjust the speed of both compressor 125 and motor 110. In various embodiments, controller 130 may adjust the speed of compressor 125 and/or motor 110 based on an optimization matrix. In various embodiments, controller 130 may iterate through the various operations of method 700 based on time, one or more preset modes, received input from ambient sensors 135, received inputs from user interface 140, or a combination thereof.

Notwithstanding the embodiments described above in FIGS. 1-9, various modifications and inclusions to those embodiments are contemplated and considered within the scope of the present disclosure.

It is also to be understood that the construction and arrangement of the elements of the systems and methods as shown in the representative embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed.

Accordingly, all such modifications are intended to be included within the scope of the present disclosure. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other illustrative embodiments without departing from scope of the present disclosure or from the scope of the appended claims.

Furthermore, functions and procedures described above may be performed by specialized equipment designed to perform the particular functions and procedures. The functions may also be performed by general-use equipment that executes commands related to the functions and procedures, or each function and procedure may be performed by a different piece of equipment with one piece of equipment serving as control or with a separate control device.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Similarly, unless otherwise specified, the phrase "based on" should not be construed in a limiting manner and thus should be understood as "based at least in part on." Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent Moreover, although the figures show a specific order of method operations, the order of the operations may differ from what is depicted. Also, two or more operations may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection operations, processing operations, comparison operations, and decision operations.

What is claimed is:

1. A system, comprising:
   a circulation unit comprising a fan motor;
   a refrigeration unit comprising a compressor;
   a controller operatively coupled to the circulation unit and the refrigeration unit, and wherein the controller is configured to
   determine a current draw associated with at least one of the motor and the compressor, wherein determining the current draw is performed iteratively according to a predetermined time interval;
   compare the current draw to a current threshold;
   adjust a speed of operation of at least one of the motor and the compressor in response to the current draw satisfying the current threshold; and after adjusting the speed of operation, wait for the predetermined time interval prior to returning to determining a subsequent current draw.

2. The system of claim 1, further comprising one or more ambient sensors in communication with the controller, wherein the controller is further configured to receive sensed information from the one or more ambient sensors.

3. The system of claim 2, wherein adjusting the speed of operation of at least one of the motor and compressor is based on the sensed information.

4. The system of claim 2, wherein the current threshold is based on the sensed information.

5. The system of claim 1, further comprising a user interface in communication with the controller, wherein the controller is further configured to receive one or more inputs via the user interface.

6. The system of claim 5, wherein adjusting the speed of operation of at least one of the motor and the compressor is based on the received one or more inputs.

7. The system of claim 5, wherein the current threshold is based on the received one or more inputs.

8. The system of claim 1, wherein the controller is further configured to determine a temperature measurement associated with at least one of the circulation unit and the refrigeration unit and, responsive to determining the temperature measurement, compare the temperature measurement to a temperature threshold.

9. The system of claim 8, wherein adjusting the speed of operation of at least one of the motor and the compressor is performed in response to the temperature measurement satisfying the temperature threshold.

10. A method, comprising:
   determining, by a controller, a current draw associated with at least one of a motor and a compressor within a dehumidifying system, wherein determining the current draw is performed iteratively according to a predetermined time interval;
   comparing, by the controller, the current draw to a current threshold; and
   adjusting, by the controller, a speed of operation of at least one of the motor and the compressor in response to the current draw satisfying the current threshold; and
   after adjusting the speed of operation, waiting by the controller, of the predetermined time interval prior to returning to determining a subsequent current draw.

11. The method of claim 10, further comprising receiving, by the controller, an input from at least one of a current sensor, an ambient sensor, and a user interface.

12. The method of claim 11, wherein the current threshold is based on the received input.

13. The method of claim 10, wherein adjusting the speed of operation of at least one of the motor and the compressor is based on the received input.

14. The method of claim 10, wherein the temperature threshold is associated with operating condition determined from an optimization matrix of a maximal capacity and maximal efficiency associated with the dehumidifying system.

15. A method, comprising:
   determining, by the controller, a temperature associated with at least one of a compressor and an ambient temperature, wherein determining the temperature comprises determining a trend in temperature over a period of time;
   determining, by the controller, that the trend in temperature is increasing or decreasing toward a temperature threshold;
   adjusting a speed of operation of at least one of the motor and the compressor in response to determining the trend in temperature is increasing or decreasing toward the temperature threshold such that the trend in temperature reverses.

16. The method of claim 15, wherein the determined temperature associated with the compressor is based on a temperature within a suction line.

17. The method of claim 15, further comprising determining, by the controller, a current draw associated with at least one of the compressor and a fan motor.

18. The method of claim 17, wherein adjusting the speed of at least one of the motor and the compressor is based on the current draw.

19. The method of claim 15, further comprising receiving, by the controller, an input from at least one of an ambient sensor and user interface.

20. The method of claim 19, wherein the temperature threshold is based on the received input.

* * * * *